M. G. LAWRENCE.
FISHLINE SPREADER.
APPLICATION FILED MAY 20, 1919.
1,352,979.
Patented Sept. 14, 1920.
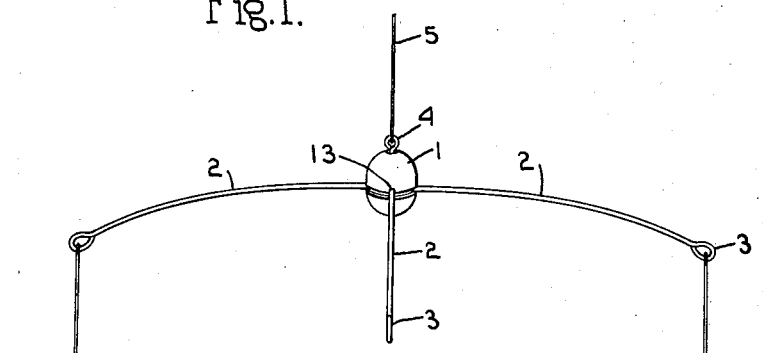
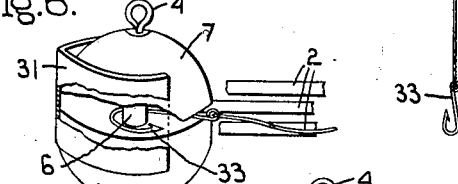
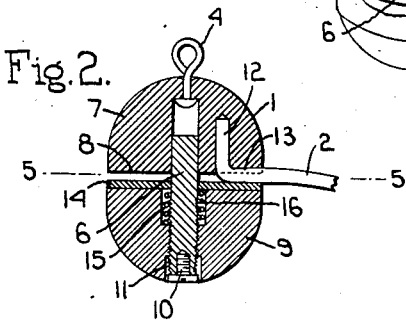
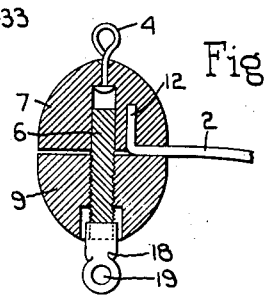
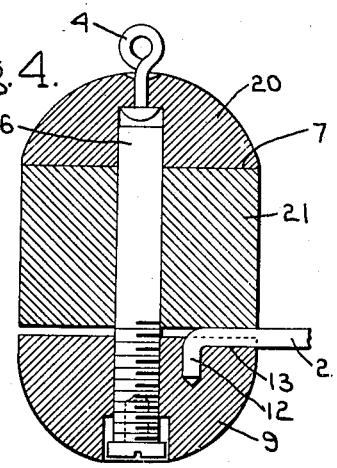
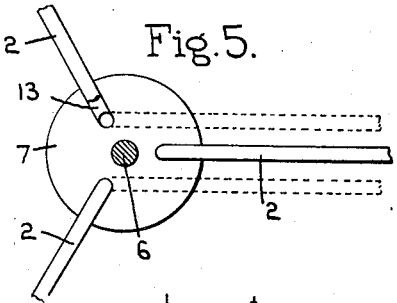
Inventor.
Melvin G. Lawrence
by Ward Smith & Tennant.
Attys.

UNITED STATES PATENT OFFICE.

MELVIN G. LAWRENCE, OF REVERE, MASSACHUSETTS.

FISHLINE-SPREADER.

1,352,979.                Specification of Letters Patent.    Patented Sept. 14, 1920.

Application filed May 20, 1919. Serial No. 298,378.

*To all whom it may concern:*

Be it known that I, MELVIN G. LAWRENCE, a citizen of the United States, residing at Revere, county of Suffolk, State of Massachusetts, have invented an Improvement in Fishline-Spreaders, of which the following description, in connection with the accompanying drawing, is a specification, like characters on the drawing representing like parts.

This invention relates to fish line spreaders such as are used by fishermen for supporting a plurality of fish hooks from a single line.

The object of the invention is to provide a novel line spreader in which the spreader arms are connected to the body in such a way as to permit the arms to be folded together when the device is not in use, thus providing a structure which can be put into a small compact space for storage or transportation.

In order to give an understanding of my invention, I have illustrated in the drawings some selected embodiments thereof which will now be described, after which the novel features will be pointed out in the appended claims.

Figure 1 is a perspective view of a fish line spreader embodying my invention;

Fig. 2 is a vertical axial sectional view through the body of the device showing one embodiment of my invention;

Fig. 3 is a view similar to Fig. 2 showing a different embodiment of the invention;

Fig. 4 is a view similar to Fig. 2 showing a still different embodiment of the invention;

Fig. 5 is a section on the line 5—5, Fig. 2.

Fig. 6 shows how the spreader may be used for protecting the fish hooks which are attached to the spreader arms.

My improved spreader comprises a body portion indicated generally at 1 and a plurality of arms 2 extending therefrom and having loops 3 at their ends to which fish hooks may be secured. The body 1 is provided with an eye 4 which is swiveled thereto and to which the fish line 5 may be secured.

One of the features of my invention relates to the manner in which the arms 2 are connected to the body 1 so as to permit said arms to be folded together when the device is to be packed away or transported. In order to provide for this I propose to pivotally connect each of the arms 2 to the body and to provide means for clamping the arms either in their spread relation shown in Fig. 1 or in their folded relation, as shown by the dotted line position, Fig. 5. This may be accomplished in various ways, a few of which are illustrated in the drawings.

I propose to make the body 1 in two parts between which the arms 2 are clamped, said two parts being indicated at 7 and 9, respectively. In Fig. 2 the upper part 7 is shown as having a flat clamping face 8 and is provided with a screw-threaded stud 6 rigid therewith which depends therefrom and with which the part 9 has screw-threaded engagement, said stud extending through said part 9. The lower end of the stud carries a screw 10 having a head somewhat larger than the stud 6, the head of said screw operating in a recess 11 in the part 9 and thus limiting the distance to which said part 9 may be unscrewed. The arms 2 are formed at their inner ends with upwardly-directed trunnion portions 12 which fit into recesses formed in the body part 7, and I will preferably form positioning grooves 13 on the clamping face 8 into which grooves the inner ends of the arms 2 are received when they are properly spread. After the arms have been placed in their proper spread relation the screwing of the clamping portion 9 of the body onto the stud 6 will clamp the inner ends of the arms 2 in the grooves 13 and thus firmly hold the arms in their spread relation. If the clamping part 9 is backed off on the stud 6 a sufficient distance to permit the arms 2 to be removed from the grooves 13, then said arms may be swung around into the parallel relation shown in dotted lines Fig. 5, thus reducing very materially the space which the device will occupy.

In the device shown in Fig. 2 I have interposed a washer or disk 14 between the two parts 7 and 9 and have formed the part 9 with a spring-receiving recess 15 in which a spring 16 is received, said spring tending to force the disk 14 upwardly. The advantage of this construction is that when the part 9 is turned backwardly to unclamp the arms 2 the expanding action of the spring 16 will operate through the disk 14 to hold the arms 2 yieldingly in the grooves 13 until the operator positively swings the arms into their parallel relation. When the device is unfolded and the arms are set in their spread relation the spring 16 forces the arms into the grooves 13 and yieldingly holds them there while the operator turns up the clamping member 9 to clamp the arms rigidly in position. Without this spring it will be necessary for the operator to hold the arms in line with the grooves 13 while the clamping member 9 is being screwed tight.

In Fig. 3 I have illustrated an embodiment of the invention similar to that shown in Fig. 2 except that the spring 16 and plate 14 are omitted. In this embodiment the member 9 acts directly on the arms 2. This construction is also slightly different in that the device for preventing the part 9 from being unscrewed from the stud 6 is in the form of a nut 18 having an eye 19 thereon, said eye 19 permitting the attachment of an added hook to the device.

In Fig. 4 I have shown a little different construction wherein the arms 2 are pivoted in the clamping member 9 rather than in the upper part. In this case, the upper part 7 is made larger and heavier; it comprises the cap portion 20 which may be of brass or similar material and the intermediate portion 21 which may be of lead or some heavy material to give weight to the device. The stud 6 which is anchored in the cap portion 20 extends through the part 21, and the lower clamping member 9 is screw-threaded thereto as in the other embodiments of the invention. In this case the trunnions 12 of the arms 2 are bent downwardly and are pivoted in the member 9, and positioning grooves 13 are also formed in said member 9. In all forms of my invention the arms are pivoted to turn about parallel axes and they are mounted to swing in the same plane from their open or spread position into their parallel folded position.

My improved spreader is simple and inexpensive to make, the device can be readily folded into a compact space, and when the arms are in their operative or spread relation they are firmly clamped in position.

My device may also be used for protecting the fish hooks during transportation. Fig. 6 shows how this may be done. When the spreader arms are folded, the fish hooks 33 attached to the ends of the arms may be inserted between the two clamping members and hooked around the stem, after which the clamping members may be tightened sufficiently to hold the hooks in this position. The clamping members thus protect the hooks so that the device can be readily carried or transported without inconvenience.

In order to prevent the hooks from being displaced, I may provide a split sleeve 31 which can be slipped over the clamping members thereby closing the opening between them.

I claim:

1. In a fish line spreader, the combination with a body having means by which it may be suspended and comprising two clamping members, of a plurality of spreader arms pivotally connected to one of said members to swing about parallel vertical axes when said body is suspended, said arms moving in the same plane and adapted to be swung from their operative spread relation into parallel folded relation, each arm having a portion received between the clamping members, and means connecting said clamping members by which they coöperate to clamp the arms between them and hold them in their spread relation.

2. In a fish line spreader, the combination with a body comprising two parts and a stud rigid with one part and to which the other part is screwed, of a plurality of spreader arms swiveled in one of said parts to swing about parallel axes and in the same plane and having a portion thereof situated between said parts whereby the arms can be swung into spread relation or folded into parallel relation and may be clamped in either position.

3. In a fish line spreader, the combination with a body comprising two parts and a stud rigid with one part and with which the other part has screw-threaded engagement, of a plurality of spreader arms having parallel trunnion portions at their inner ends which are swiveled in one of said parts, said part having positioning grooves to receive the arms and a portion of the arms being situated between said parts whereby said arms may be clamped in either their spread relation or folded relation.

4. In a fish line spreader, the combination with a body comprising two clamping members, of a plurality of spreader arms pivotally mounted in said body and adapted to be swung from their operative spread relation into parallel relations, means connecting the clamping members by which the arms may be clamped in adjusted position, and a split sleeve adapted to be applied to the body when the arms are folded thereby to retain fish hooks between said clamping members.

In testimony whereof I have signed my name to this specification.

MELVIN G. LAWRENCE.